US008150407B2

(12) United States Patent
Ho et al.

(10) Patent No.: US 8,150,407 B2
(45) Date of Patent: Apr. 3, 2012

(54) SYSTEM AND METHOD FOR SCHEDULING TRANSMISSIONS IN A WIRELESS COMMUNICATION SYSTEM

(75) Inventors: Sai Yiu Duncan Ho, San Diego, CA (US); Aleksandar Damnjanovic, San Diego, CA (US); Aziz Gholmieh, San Diego, CA (US); Edward G. Tiedemann, Jr., Concord, MA (US); Gang Bao, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 10/773,660

(22) Filed: Feb. 6, 2004

(65) Prior Publication Data

US 2005/0003843 A1   Jan. 6, 2005

Related U.S. Application Data

(60) Provisional application No. 60/448,269, filed on Feb. 18, 2003, provisional application No. 60/470,225, filed on May 12, 2003.

(51) Int. Cl.
*H04W 72/00* (2009.01)
*H04W 4/00* (2009.01)
*H04J 3/16* (2006.01)

(52) U.S. Cl. .................. 455/452.2; 455/450; 455/452.1; 370/329; 370/437

(58) Field of Classification Search .................. 455/450, 455/451, 452.1, 452.2, 453; 370/329, 437, 370/449
See application file for complete search history.

(56) References Cited

U.S. PATENT DOCUMENTS

| | | | |
|---|---|---|---|
| 2,149,518 A | 3/1939 | Frank, Sr. | |
| 3,470,324 A | 9/1969 | Harmuth | |
| 4,768,023 A | 8/1988 | Xie | |
| 5,280,472 A | 1/1994 | Gilhousen et al. | |
| 5,394,433 A | 2/1995 | Bantz et al. | |
| 5,406,585 A | 4/1995 | Rohani et al. | |
| 5,463,342 A | 10/1995 | Guard | |

(Continued)

FOREIGN PATENT DOCUMENTS

CN        1166094       11/1997

(Continued)

OTHER PUBLICATIONS

Non-Final Office Action mailed Nov. 4, 2005 in U.S. Appl. No. 10/646,955, now U.S. Patent No. 7,155,236.

(Continued)

*Primary Examiner* — Un C Cho
(74) *Attorney, Agent, or Firm* — François A. Pelaez (57) ABSTRACT

Systems and methods for scheduling data transmissions in a wireless communication system using scheduling requests and grants. In one embodiment, a wireless communication system has a base station and one or more mobile stations coupled by a wireless link having forward- and reverse-link channels. The base station is configured to receive requests from the mobile stations, to process the requests independently of a base station controller, to allocate communication link resources among the mobile stations, and, if necessary, to transmit one or more grants to the mobile stations in accordance with the allocation of communication link resources. Each mobile station is configured to transmit data to the base station in accordance with any grants received from the base station.

44 Claims, 4 Drawing Sheets

U.S. PATENT DOCUMENTS

| | | | |
|---|---|---|---|
| 5,483,557 A | 1/1996 | Webb | |
| 5,535,214 A | 7/1996 | Shiobara | |
| 5,544,156 A | 8/1996 | Teder et al. | |
| 5,553,062 A | 9/1996 | Schilling et al. | |
| 5,581,575 A | 12/1996 | Zehavi et al. | |
| 5,592,470 A | 1/1997 | Rudrapatna et al. | |
| 5,627,938 A | 5/1997 | Johnston | |
| 5,647,366 A | 7/1997 | Weng | |
| 5,712,869 A | 1/1998 | Lee et al. | |
| 5,719,852 A | 2/1998 | Schilling et al. | |
| 5,726,978 A | 3/1998 | Frodigh et al. | |
| 5,732,391 A | 3/1998 | Fiocca | |
| 5,745,480 A * | 4/1998 | Behtash et al. | 370/252 |
| 5,752,193 A | 5/1998 | Scholefield et al. | |
| 5,754,537 A | 5/1998 | Jamal | |
| 5,764,551 A | 6/1998 | McCorkle | |
| 5,774,809 A | 6/1998 | Tuutijarvi et al. | |
| 5,781,861 A | 7/1998 | Kang et al. | |
| 5,809,059 A | 9/1998 | Souissi et al. | |
| 5,815,526 A | 9/1998 | Rice | |
| 5,857,174 A | 1/1999 | Dugan | |
| 5,862,451 A | 1/1999 | Grau et al. | |
| 5,864,760 A | 1/1999 | Gilhousen et al. | |
| 5,875,214 A | 2/1999 | Urbaniak et al. | |
| 5,903,608 A | 5/1999 | Chun | |
| 5,914,950 A | 6/1999 | Tiedemann, Jr. et al. | |
| 5,923,650 A | 7/1999 | Chen et al. | |
| 5,938,749 A | 8/1999 | Rusu et al. | |
| 5,956,642 A | 9/1999 | Larsson et al. | |
| 5,966,377 A | 10/1999 | Murai | |
| 5,966,670 A | 10/1999 | Keskitalo et al. | |
| 5,969,751 A | 10/1999 | Lee | |
| 5,973,642 A | 10/1999 | Li et al. | |
| 5,991,271 A | 11/1999 | Jones et al. | |
| 5,991,273 A | 11/1999 | Abu-Dayya | |
| 6,005,876 A | 12/1999 | Cimini, Jr. | |
| 6,014,373 A | 1/2000 | Schilling et al. | |
| 6,046,980 A | 4/2000 | Packer | |
| 6,049,716 A | 4/2000 | Jung | |
| 6,052,594 A | 4/2000 | Chuang et al. | |
| 6,061,359 A | 5/2000 | Schilling et al. | |
| 6,064,692 A | 5/2000 | Chow | |
| 6,085,091 A | 7/2000 | Yoo et al. | |
| 6,088,387 A | 7/2000 | Gelblum et al. | |
| 6,094,459 A | 7/2000 | Kao et al. | |
| 6,108,374 A | 8/2000 | Balachandran et al. | |
| 6,108,384 A | 8/2000 | Okumura et al. | |
| 6,111,911 A | 8/2000 | Sanderford, Jr. et al. | |
| 6,115,357 A | 9/2000 | Packer et al. | |
| 6,128,283 A | 10/2000 | Sabaa et al. | |
| 6,128,349 A | 10/2000 | Chow | |
| 6,128,882 A | 10/2000 | Jones | |
| 6,130,882 A | 10/2000 | Levin | |
| 6,131,016 A | 10/2000 | Greenstein et al. | |
| 6,134,215 A | 10/2000 | Agrawal et al. | |
| 6,134,218 A | 10/2000 | Holden | |
| 6,141,388 A | 10/2000 | Servais et al. | |
| 6,144,654 A | 11/2000 | Ibanez-Meier et al. | |
| 6,195,552 B1 | 2/2001 | Jeong et al. | |
| 6,201,576 B1 | 3/2001 | Raghunath et al. | |
| 6,201,954 B1 | 3/2001 | Soliman | |
| 6,205,129 B1 | 3/2001 | Esteves et al. | |
| 6,208,699 B1 | 3/2001 | Chen et al. | |
| 6,208,858 B1 | 3/2001 | Antonio et al. | |
| 6,219,374 B1 | 4/2001 | Kim et al. | |
| 6,222,875 B1 | 4/2001 | Dahlman et al. | |
| 6,222,888 B1 | 4/2001 | Kao et al. | |
| 6,233,455 B1 | 5/2001 | Ramakrishna et al. | |
| 6,259,746 B1 | 7/2001 | Levin et al. | |
| 6,292,515 B1 | 9/2001 | Kao et al. | |
| 6,298,041 B1 | 10/2001 | Packer | |
| 6,307,844 B1 | 10/2001 | Tsunehara et al. | |
| 6,335,922 B1 | 1/2002 | Tiedemann, Jr. et al. | |
| 6,347,080 B2 | 2/2002 | Jou et al. | |
| 6,363,255 B1 | 3/2002 | Kuwahara | |
| 6,389,056 B1 | 5/2002 | Kanterakis et al. | |
| 6,414,988 B1 | 7/2002 | Ling | |
| 6,425,105 B1 | 7/2002 | Piirainen et al. | |
| 6,442,130 B1 | 8/2002 | Jones, IV et al. | |
| 6,456,653 B1 | 9/2002 | Sayeed | |
| 6,483,816 B2 | 11/2002 | Tsunehara et al. | |
| 6,490,461 B1 | 12/2002 | Muller | |
| 6,496,496 B1 | 12/2002 | Ramakrishna et al. | |
| 6,505,058 B1 | 1/2003 | Willey | |
| 6,512,925 B1 | 1/2003 | Chen et al. | |
| 6,532,363 B1 | 3/2003 | Pussinen | |
| 6,535,723 B1 | 3/2003 | Jiang et al. | |
| 6,549,561 B2 | 4/2003 | Crawford | |
| 6,563,885 B1 | 5/2003 | Magee et al. | |
| 6,570,444 B2 | 5/2003 | Wright | |
| 6,571,101 B1 * | 5/2003 | Schulz | 455/450 |
| 6,571,104 B1 | 5/2003 | Nanda et al. | |
| 6,574,205 B1 | 6/2003 | Sato | |
| 6,590,879 B1 | 7/2003 | Huang et al. | |
| 6,597,913 B2 * | 7/2003 | Natarajan | 455/12.1 |
| 6,609,007 B1 | 8/2003 | Eibling et al. | |
| 6,654,609 B2 | 11/2003 | Kim | |
| 6,680,925 B2 | 1/2004 | Wu et al. | |
| 6,693,892 B1 | 2/2004 | Rinne et al. | |
| 6,701,151 B2 * | 3/2004 | Diachina et al. | 455/452.1 |
| 6,711,208 B2 | 3/2004 | Razoumov et al. | |
| 6,741,862 B2 | 5/2004 | Chung et al. | |
| 6,744,754 B1 | 6/2004 | Lee | |
| 6,751,264 B2 | 6/2004 | Ho et al. | |
| 6,751,444 B1 | 6/2004 | Meiyappan | |
| 6,757,241 B1 | 6/2004 | Jones et al. | |
| 6,760,303 B1 | 7/2004 | Brouwer | |
| 6,775,544 B2 | 8/2004 | Ficarra | |
| RE38,603 E | 9/2004 | Kim et al. | |
| 6,816,827 B1 | 11/2004 | Xia et al. | |
| 6,836,666 B2 * | 12/2004 | Gopalakrishnan et al. | 455/452.2 |
| 6,847,826 B1 | 1/2005 | Wesby et al. | |
| 6,847,828 B2 | 1/2005 | Miyoshi et al. | |
| 6,865,389 B2 | 3/2005 | Lee et al. | |
| 6,880,103 B2 | 4/2005 | Kim et al. | |
| 6,898,418 B2 | 5/2005 | Rauschmayer | |
| 6,904,286 B1 | 6/2005 | Dantu | |
| 6,917,581 B2 | 7/2005 | Proctor, Jr. et al. | |
| 6,937,582 B1 | 8/2005 | Kronestedt | |
| 6,952,561 B1 | 10/2005 | Kumar et al. | |
| 6,982,946 B2 | 1/2006 | Wiberg et al. | |
| 6,987,798 B2 | 1/2006 | Ahn et al. | |
| 7,006,429 B2 | 2/2006 | Yoshida et al. | |
| 7,016,651 B1 | 3/2006 | Narasimhan | |
| 7,031,741 B2 | 4/2006 | Lee et al. | |
| 7,050,406 B2 | 5/2006 | Hsu et al. | |
| 7,054,275 B2 | 5/2006 | Kim et al. | |
| 7,061,986 B2 | 6/2006 | Tonissen et al. | |
| 7,068,702 B2 | 6/2006 | Chen et al. | |
| 7,069,038 B2 | 6/2006 | Hakkinen et al. | |
| 7,072,315 B1 | 7/2006 | Liu et al. | |
| 7,076,001 B2 | 7/2006 | Beadle et al. | |
| 7,092,706 B2 | 8/2006 | Yang | |
| 7,099,397 B2 | 8/2006 | Lee et al. | |
| 7,103,021 B2 | 9/2006 | Jou | |
| 7,120,134 B2 | 10/2006 | Tiedemann, Jr. et al. | |
| 7,126,930 B2 | 10/2006 | Pankaj et al. | |
| 7,155,236 B2 | 12/2006 | Chen et al. | |
| 7,158,504 B2 * | 1/2007 | Kadaba et al. | 370/348 |
| 7,164,669 B2 | 1/2007 | Li et al. | |
| 7,177,367 B2 | 2/2007 | Storm | |
| 7,187,646 B2 | 3/2007 | Schramm | |
| 7,190,964 B2 | 3/2007 | Damnjanovic et al. | |
| 7,197,085 B1 | 3/2007 | Vella-Coleiro | |
| 7,215,930 B2 | 5/2007 | Malladi | |
| 7,257,101 B2 | 8/2007 | Petrus et al. | |
| 7,269,186 B2 | 9/2007 | Abrol et al. | |
| 7,269,389 B2 | 9/2007 | Petrus et al. | |
| 7,272,199 B2 | 9/2007 | Storm et al. | |
| 7,274,743 B2 | 9/2007 | Kim | |
| 7,277,709 B2 | 10/2007 | Vadgama | |
| 7,286,558 B2 | 10/2007 | Kim et al. | |
| 7,286,846 B2 | 10/2007 | Chen et al. | |
| 7,289,529 B2 | 10/2007 | Sherman | |
| 7,299,402 B2 | 11/2007 | Soong et al. | |
| 7,313,167 B2 | 12/2007 | Yoon et al. | |

| | | | |
|---|---|---|---|
| 7,317,711 B2 | 1/2008 | Bae et al. | |
| 7,327,716 B2 | 2/2008 | Fong et al. | |
| 7,336,640 B2 | 2/2008 | McDonough et al. | |
| 7,336,954 B2 | 2/2008 | Wang et al. | |
| 7,423,992 B2 | 9/2008 | Iwamura | |
| 7,447,258 B2 | 11/2008 | Pietila et al. | |
| 7,447,287 B1 * | 11/2008 | Parantainen | 375/354 |
| 7,463,702 B2 | 12/2008 | Ammer et al. | |
| 7,706,403 B2 | 4/2010 | Hosein | |
| 2001/0012271 A1 | 8/2001 | Berger | |
| 2002/0021683 A1 | 2/2002 | Holtzman et al. | |
| 2002/0021692 A1 | 2/2002 | Huh et al. | |
| 2002/0051432 A1 | 5/2002 | Shin | |
| 2002/0057730 A1 | 5/2002 | Karlsson et al. | |
| 2002/0093918 A1 | 7/2002 | Kim et al. | |
| 2002/0111183 A1 | 8/2002 | Lundby | |
| 2002/0131522 A1 | 9/2002 | Felgentreff | |
| 2002/0136271 A1 | 9/2002 | Hiramatsu et al. | |
| 2002/0137521 A1 * | 9/2002 | Kim et al. | 455/453 |
| 2002/0150077 A1 | 10/2002 | Temerinac | |
| 2002/0160767 A1 | 10/2002 | Hanly | |
| 2002/0172192 A1 | 11/2002 | Hunzinger et al. | |
| 2002/0172217 A1 | 11/2002 | Kadaba et al. | |
| 2002/0183039 A1 * | 12/2002 | Padgett et al. | 455/406 |
| 2003/0028251 A1 | 2/2003 | Mathews | |
| 2003/0031130 A1 | 2/2003 | Vanghi | |
| 2003/0039317 A1 | 2/2003 | Taylor et al. | |
| 2003/0081538 A1 | 5/2003 | Walton et al. | |
| 2003/0123392 A1 | 7/2003 | Ruutu et al. | |
| 2003/0129981 A1 | 7/2003 | Kim | |
| 2003/0137953 A1 | 7/2003 | Chae et al. | |
| 2003/0142656 A1 | 7/2003 | Padovani et al. | |
| 2003/0152102 A1 | 8/2003 | Morgan et al. | |
| 2003/0219037 A1 | 11/2003 | Toskala et al. | |
| 2004/0013102 A1 | 1/2004 | Fong et al. | |
| 2004/0101035 A1 | 5/2004 | Boer et al. | |
| 2004/0160914 A1 * | 8/2004 | Sarkar | 370/329 |
| 2004/0160922 A1 * | 8/2004 | Nanda et al. | 370/335 |
| 2004/0160933 A1 | 8/2004 | Odenwalder et al. | |
| 2004/0162083 A1 * | 8/2004 | Chen et al. | 455/454 |
| 2004/0162098 A1 * | 8/2004 | Wei et al. | 455/522 |
| 2004/0203973 A1 | 10/2004 | Khan | |
| 2004/0224711 A1 | 11/2004 | Panchal et al. | |
| 2004/0228283 A1 | 11/2004 | Naguib et al. | |
| 2004/0228349 A1 * | 11/2004 | Vrzic et al. | 370/395.4 |
| 2004/0228389 A1 | 11/2004 | Odenwalder | |
| 2005/0002324 A1 | 1/2005 | Sutivong et al. | |
| 2005/0004970 A1 | 1/2005 | Jain et al. | |
| 2005/0007986 A1 | 1/2005 | Malladi et al. | |
| 2005/0176456 A1 | 8/2005 | Chen et al. | |
| 2005/0254465 A1 * | 11/2005 | Lundby et al. | 370/335 |
| 2006/0007892 A1 | 1/2006 | Sudo | |
| 2006/0019701 A1 | 1/2006 | Ji | |
| 2006/0128410 A1 | 6/2006 | Derryberry et al. | |
| 2006/0165126 A1 | 7/2006 | Petersson et al. | |
| 2006/0183497 A1 | 8/2006 | Paranchych et al. | |
| 2006/0215737 A1 | 9/2006 | Bang et al. | |
| 2006/0264220 A1 | 11/2006 | Chen et al. | |
| 2007/0111669 A1 | 5/2007 | Malladi | |
| 2008/0043683 A1 | 2/2008 | Kwon et al. | |
| 2008/0194286 A1 | 8/2008 | Chen et al. | |

FOREIGN PATENT DOCUMENTS

| | | | |
|---|---|---|---|
| CN | 1263675 | | 8/2000 |
| EP | 627827 A2 | | 12/1994 |
| EP | 0783210 A2 | | 7/1997 |
| EP | 0809364 A2 | | 11/1997 |
| EP | 0921652 A2 | | 6/1999 |
| EP | 0996304 A1 | | 4/2000 |
| EP | 1104127 | | 5/2001 |
| EP | 1231807 A2 | | 8/2002 |
| EP | 1257140 A1 | | 11/2002 |
| EP | 1292057 A1 | | 3/2003 |
| EP | 1326471 | | 12/2008 |
| GB | 2301687 A | | 12/1996 |
| GB | 2352944 A | | 2/2001 |
| JP | 6350562 A | | 12/1994 |
| JP | 08298498 A | | 12/1996 |
| JP | 10013325 A | | 1/1998 |
| JP | 11098120 A | | 4/1999 |
| JP | 11154919 A | | 6/1999 |
| JP | 11196043 | | 7/1999 |
| JP | 11508417 T | | 7/1999 |
| JP | 2000299680 A | | 10/2000 |
| JP | 2000513549 | | 10/2000 |
| JP | 2000349740 | | 12/2000 |
| JP | 2001016139 A | | 1/2001 |
| JP | 2001036500 A | | 2/2001 |
| JP | 2001238269 A | | 8/2001 |
| JP | 2001515300 T | | 9/2001 |
| JP | 2001517017 T | | 10/2001 |
| JP | 2002026808 A | | 1/2002 |
| JP | 200277984 | | 3/2002 |
| JP | 2002508137 T | | 3/2002 |
| JP | 2002508896 T | | 3/2002 |
| JP | 2002159061 A | | 5/2002 |
| JP | 2002522988 T | | 7/2002 |
| JP | 2002232943 A | | 8/2002 |
| JP | 2002528954 T | | 9/2002 |
| JP | 2002531992 | | 9/2002 |
| JP | 2002534020 | | 10/2002 |
| JP | 2003008521 A | | 1/2003 |
| JP | 2003018117 | | 1/2003 |
| JP | 2003032218 | | 1/2003 |
| JP | 2003060606 A | | 2/2003 |
| JP | 2003060609 A | | 2/2003 |
| JP | 2003069523 A | | 3/2003 |
| JP | 2004032518 A | | 1/2004 |
| JP | 2004166038 A | | 6/2004 |
| JP | 2004214746 | | 7/2004 |
| JP | 2004320679 A | | 11/2004 |
| JP | 2005505168 | | 2/2005 |
| JP | 2005505955 T | | 2/2005 |
| JP | 2008072733 A | | 3/2008 |
| KR | 19960015862 | | 11/1996 |
| KR | 100214293 | | 5/1999 |
| KR | 2001056478 A | * | 7/2001 |
| KR | 20020076091 | | 10/2002 |
| KR | 20020085674 A | | 11/2002 |
| KR | 20020089164 | | 11/2002 |
| KR | 100406531 | | 11/2003 |
| RU | 2073913 C1 | | 2/1997 |
| RU | 2111619 | | 5/1998 |
| RU | 2115246 C1 | | 7/1998 |
| RU | 2120198 C1 | | 10/1998 |
| RU | 2149518 | | 5/2000 |
| RU | 2183910 C2 | | 6/2002 |
| RU | 2189696 C2 | | 9/2002 |
| WO | WO9205556 | | 4/1992 |
| WO | WO9507578 | | 3/1995 |
| WO | WO9510144 A1 | | 4/1995 |
| WO | WO9512297 | | 5/1995 |
| WO | WO9701256 A1 | | 1/1997 |
| WO | WO9733399 A1 | | 9/1997 |
| WO | WO9835525 | | 8/1998 |
| WO | WO9836606 | | 8/1998 |
| WO | WO9845966 | | 10/1998 |
| WO | WO9901994 | | 1/1999 |
| WO | WO9904525 | | 1/1999 |
| WO | WO9907089 A1 | | 2/1999 |
| WO | WO9912282 | | 3/1999 |
| WO | WO9929054 A1 | | 6/1999 |
| WO | WO0008869 A2 | | 2/2000 |
| WO | WO0038444 | | 6/2000 |
| WO | WO0042752 A1 | | 7/2000 |
| WO | WO0048328 A1 | | 8/2000 |
| WO | WO0065743 A1 | | 11/2000 |
| WO | WO0072622 | | 11/2000 |
| WO | WO0106714 | | 1/2001 |
| WO | WO0110159 | | 2/2001 |
| WO | WO0117158 | | 3/2001 |
| WO | WO0124568 | | 4/2001 |
| WO | WO0128194 | | 4/2001 |
| WO | WO0141318 A2 | | 6/2001 |
| WO | WO0199303 | | 12/2001 |
| WO | WO0199312 | | 12/2001 |
| WO | WO0201762 | | 1/2002 |
| WO | WO0231991 | | 4/2002 |

| | | |
|---|---|---|
| WO | WO0233838 | 4/2002 |
| WO | WO0237693 A2 | 5/2002 |
| WO | WO0241531 | 5/2002 |
| WO | WO02063818 A1 | 8/2002 |
| WO | WO02065664 | 8/2002 |
| WO | WO02080400 A2 | 10/2002 |
| WO | WO02095960 A2 | 11/2002 |
| WO | WO03084163 A1 | 10/2003 |
| WO | WO2005/015942 | 2/2005 |

OTHER PUBLICATIONS

Taiwanese Search report—093103844—TIPO—Oct. 21, 2010.
3G TS 25.211 "Physical channels and mapping of transport channels onto physical channels (FDD)", Release 5, V5.0.0, Mar. 2002.
3G TS 25.212 "Multiplexing and channel coding (FDD)", Release 5, V5.0.0, Mar. 2002.
3G TS 25.213 "Spreading and modulation (FDD)", Release 5, V5.0.0, Mar. 2002.
3G TS 25.214 "Physical layer procedures (FDD)", Release 5, V5.0.0, Mar. 2002.
3GPP2 C.S0024, Version 2.0: "cdma2000 High Rate Packet Data Air Interface Specification," pp. 1-441 (Oct. 27, 2000).
3GPP2 C.S0024: "cdma2000 High Rate Packet Data Air Interface Specification" 3GPP Standards, Sep. 12, 2000, XP002206456.
3rd Generation Partnership Proect, Technical Specification Group Radio Access Network: 3GPP TS 25.322 V4.7.0; Radio Access Link Control (RLC) Protocol Specification; Release 4, Dec. 2002, pp. 1-76.
Adachi, F. et al: "Wideband Multi-rate DS-CDMA for Next Generation Mobile Communications Systems", Wireless Communications Conference (1997). Boulder, CO, USA Aug. 11-13, 1997, New York, NY, USA, IEEE, US, Aug. 11, 1997, pp. 57-62, XP010245557, DOI: DOI:10.1109/WCC.1997.622247, ISBN: 978-0-7803-41 94-4.
Attar, R. A., et al., "A Reverse Link Outer-Loop Power Control Algorithm for CDMA2000 1xEV Systems" ICC 2002. 2002 IEEE International Conference on Communications. Conference Proceedings. New York, NY, Apr. 28-May 2, 2002, IEEE International Conference on Communications, New York, NY: IEEE, US, vol. 1 of 5 Apr. 28, 2002 pp. 573-578, XP010589559, ISBN: 0-7803-7400-2.
Chakravarty S et al: "An Algorithm for Reverse Traffic Channel Rate Control for cdma2000 High Rate Packet Data Systems" IEEE Global Telecommunications Conferenc, 2001. Globecom 01. E. San Antonio, TX, Nov. 25-29, 2001, IEEEGlobal Telecommunications Conference , New York, NY : IEEE, US, vol. 6 of 6, Nov. 25, 2001, pp. 3733-3737, XP002277693.
Chen, Tau, "Method and Apparatus for Forward Link Power Control During Soft Handoff in a Communication System", U.S. Appl. No. 60/356,929 entitled, filed Feb. 12, 2002, Qualcomm Incorporated.
ETSI TS 125.211 v3.5.0 (Dec. 2000);Universal Mobile Telecommunications Systems (UMTS); Physical channels and mapping of transport channels onto physical channels (FDD), 3GPP TS 25.211 version 3.5.0 Release 1999).
European Search Report—EP10172964 ,Search Authority—Berlin Patent Office, Sep. 28, 2010.
Fujii, T. et al., "Best Effort Cell Structure Using Sub-carrier Selected MC-CDMA System," The Institute of Electronics, Information and Communication Engineers, Nov. 15, 2002, vol. 102, No. 465, pp. 65-72, IEICE Technical Report RCS 2002-203 (English Abstract).
Gyung-Ho Hwang and Dong-Ho Cho, Distributed Rate Control for Throughput Maximization and QoS Support in WCDMA System, IEEE VTC, U.S. IEEE, Oct. 7, 2001, vol. 3, pp. 1721-1725.
Hamaguchi, et al., "Characteristics of Orthogonal Slow-FH/16QAM method applying Interference-resistant Demodulation," Proceedings of Inst. Of Electronics, Information and Communication Engineers, B-II, Jun. 25, 1995, vol. J78, B-II, No. 6, pp. 445-453.

"Mobile Station-Base Station Compatibility Standard for Wideband Spread Spectrum Cellular Systems," TIA/EIA Interim Standard, Feb. 3, 1999, XP002145331, pp. 6-380,6 (TIA/EIA-95-B).
Nadagopal T., et al., "Service Differentiation Through End-To-End Rate Control in Low Bandwith Wireless Packet Networks," 1999. IEEE International Workshop. San Diego CA USA Nov. 15-17, 1999, Mobile Mutlimedia Communications 1999, 211-220.
Sarkar S et al., "Adaptive Control of the Reverse Link in CDMA2000", International Journal of Wireless Information Networks, Plenum Press, NY, US, vol. 9, No. Jan. 1, 2002, pp. 55-70, XP002300880, ISSN: 1068-9605, p. 56, right-hand column, line 12—p. 61, right-hand column, line 4, p. 63, left-hand column.
Sarkar S., et al., "CDMA2000 Reverse Link: Design and System Performance"VTC 2000—Fall. IEEE VTS 52nd, Vehicular Technology Conference, Boston, MA, Sep. 24-28, 2000. vol. 6 of 6 Conf. 52, pp. 2713-2719,XP010525079.
Schreiber, W. F: "Spread—Spectrum Television Broadcasting", SMPTE Journal, SMPTE Inc. Scarsdale, N.Y, US, vol. 101, No. 8, Aug. 1, 1992, pp. 538-549, XP000296026, ISSN: 0036-1682.
Sklar, B. "Digital Communications, Fundamentals and Applications", 4 pages, 2001. Prentice-Hall PTR. Upper Saddle River, New Jersey, USA.
Sohn et al., "Blind Rate Detection Algorithm in WCDMA Mobile Receiver", IEEE 54th Vehicular Technology Conference Proceedings, Atlantic City, NJ, Oct. 7, 2001, pp. 1589-1592.
Sunay, M. Oguz, et al., "Provision of Variable Data Rates in Third Generation Wideband DS CDMA Sytems" Wireless Communications and Networking Conference, 1999. WCNC. 1999 IEEE New Orleans, LA, USA, Sep. 21-24, 1999, pp. 505-509, XP010353838.
"The cdma2000 ITU-R RTT Candidate Submission (0.18)," Telecommunications Industry Association TIA, Jul. 27, 1998, XP002294165, pp. 1-145.
TIA EIA interim Standard IS-856-1, 'CDMA.2000 High Rate Packet Data Air Interface Specification,' Addendum 1, Jan. 2002. pp. 9-23-9-57, XP002299790.
TIA/EIA-95; "Mobile Station—Base Station Compatibility Standard for Wideband Spread Spectrum Celluar Systems"(Mar. 1999).
TIA/EIA-IS-2000 Release C, "Introduction to cdma2000 Standards for Spread Spectrum Systems, Release C" (3GPP2 C.S0001-C, Version 1.0) May 28, 2002.
"Universal Mobile Telecommunications System (UMTS); Physical channels and mapping of transport channels onto physical channels (FDD) (3GPP TS 25.211 version 5.3.0 Release 5)", ETSI TS 125 211 v 5.3.0 (Dec. 2002), pp. 1-52.
You Y-H., et al., "MC-VSG BNET System for High-Rate Wireless Personal Area Network Applications, New York US," IEEE Transactions on Consumer Electronics, IEEE Inc., vol. 48, No. 2, May 2002, pp. 254-264,XP001200452.
Young-Joo Song et al. "Rate-control Snoop : A Reliable Transport Protocol for Heterogeneous Networks with Wired and Wireless Links", IEEE Proceedings 2003, vol. 2, Mar. 16, 2003, pp. 1334-1338.
Young-UK Chung et al, "An Efficient Reverse Link Data Rate Control Scheme for 1xEV-DV System," IEEE 54TH. Vehnicular Technology Conference Proceedings. Atlantic City, NJ, Oct. 7-11, 2001. IEEE, US. vol. 1 of 4, Conf. 54, Oct. 10, 2001, pp. 820-823.
Chen, Tau, "Method and Apparatus for Forward Link Power Control During Soft Handoff in a Communication System", U.S. Appl. No. 60/356,929 entitled, filed Feb. 12, 2002, QUALCOMM Incorporated.
Supplementarty European Search Report—EP04752264—Search Authority—Berlin—Jun. 22, 2011.
Taiwan Search Report—TW093106052—TIPO—Mar. 28, 2011.

* cited by examiner

SYSTEM AND METHOD FOR SCHEDULING TRANSMISSIONS IN A WIRELESS COMMUNICATION SYSTEM

CLAIM OF PRIORITY UNDER 35 U.S.C. §119

The present Application for Patent claims priority to Provisional Application No. 60/448,269 entitled "Reverse Link Data Communication" filed Feb. 18, 2003, and Provisional Application No. 60/470,225 entitled "Method and Apparatus for Quality of Service in IS-2000 Reverse Link" filed May 12, 2003, and assigned to the assignee hereof and hereby expressly incorporated by reference herein.

BACKGROUND

1. Field

The invention relates generally to the field of telecommunications, and more particularly to systems and methods for scheduling data transmissions in a wireless communication system using scheduling requests and grants.

2. Background

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, wireless communication systems must deal with issues relating to transmission scheduling between a base station and its mobile stations when the quality of the wireless communication channels between them is constantly changing. The base station and mobile stations must therefore deal with the issue of how much data can be transmitted in light of the prevailing conditions rather than simply scheduling transmissions, as in a wireline system.

One type of wireless communication system comprises a cellular CDMA (code division multiple access) system which is configured to support voice and data communications. This system may have multiple base stations which communicate via wireless channels with multiple mobile stations. (The base stations are also typically coupled via wireline networks to various other systems, such as a base switching station that may couple the base stations to the internet or a public switched telephone network.)

As mobile stations move through the area covered by the wireless communication system, they may communicate with multiple base stations. The mobile stations may also be handed off from one base station to another. This is referred to as a handoff between the base stations. Conventionally, because the mobile stations are handed off from one base station to another, the scheduling of transmissions, particularly transmissions from the mobile stations to the base stations, is handled by the base station controller, which is coupled to the base stations and can therefore account for the handoffs of the mobile stations.

While the transmissions are conventionally scheduled by the base station controller, this does cause some delay in the scheduling. This delay is a result of the fact that the information relevant to scheduling (e.g., a request message) is carried in Layer 3 messages that are first obtained by the base stations, and then transmitted to the base station controller, which makes appropriate scheduling decisions and then transmits the resulting scheduling information back to the base stations. Adding to this delay is the fact that Layer 3 messages have to be processed by the LAC layer (which is above the MAC layer, but below Layer 3). Also, Layer 3 messages are commonly processed by a shared CPU, rather than a dedicated CPU, although this varies from implementation to implementation. Further contributing to the delay is the propagation delay between the base station and base station controller, where Layer 3 messages are commonly processed. There is therefore a need in the art for systems and methods that perform scheduling of data transmissions without incurring the delays experienced in the prior art.

SUMMARY

Embodiments of the invention which are disclosed herein address one or more of the needs indicated above by performing at least a portion of the data transmission scheduling at the base station rather than the base station controller.

In one embodiment, a wireless communication system having a base station and one or more mobile stations provides, between the base station and each mobile station, a forward link for communicating information from the base station to the mobile station, and a reverse link for communicating information from the mobile station to the base station. The system is configured to allocate reverse link resources using a request-grant mechanism. According to this mechanism, the mobile station accumulates data in one or more buffers. Each buffer stores data for a particular class of service. When the amount of data in one of the buffers reaches a threshold, the mobile station generates a request message and transmits this message to the base station. The base station receives the request message, as well as request messages from other mobile stations, and processes the requests to determine an allocation of the available reverse link resources. Based on this allocation, the base station may transmit one or more grant messages to the mobile stations, granting the mobile stations permission to transmit data for specified classes of service. The mobile stations then transmit their data to the base station as authorized by the grant messages. If a mobile station did not receive a grant to transmit data, the mobile station may transmit the data autonomously at a predetermined rate, which is typically lower than the rates at which transmission under a grant can proceed.

One embodiment of the invention comprises a base station having a transceiver subsystem and a processing subsystem, where the processing subsystem is configured to receive a request for service from a mobile station and to make a determination whether or not to issue a grant to transmit data (a "grant") to the mobile station in response to the request for grant. The processing of the request occurs in the base station at the medium access control layer. The base station may issue an individual grant or a common grant responsive to the request. Alternatively, no grant may be issued at all. The request identifies a particular class of service. The grant can specify the granted traffic to pilot ratio for multiple classes of service if it is a common grant, but not if the grant is an individual grant.

One embodiment of the invention comprises a mobile station having a transceiver subsystem and a processing subsystem coupled to the transceiver subsystem, where the processing subsystem is configured to process information received from the transceiver subsystem and to generate information to be transmitted by the transceiver subsystem. In particular, the processing subsystem is configured to generate a request for transmission to a base station, to identify a corresponding grant received from the base station, and to control the transceiver subsystem to transmit data according to the received grant. The request specifies one of a set of available classes of service. A grant may also specify a particular class of service (a common grant specifies a class of service, but an individual grant does not). When a grant is received, the mobile station transmits data corresponding to the traffic to pilot ratio identified by the grant.

One embodiment of the invention is a wireless communication system having a base station and one or more mobile stations configured to communicate with the base station via corresponding wireless communication links. Each mobile station is configured to transmit requests for grants to the base station. The base station is configured to receive requests from the mobile stations, to process the requests independently of a base station controller, to allocate communication link resources among the mobile stations, and, if necessary, to transmit one or more grants to the mobile stations in accordance with the allocation of communication link resources. Each mobile station is configured to transmit data to the base station in accordance with any grants received from the base station.

One embodiment of the invention comprises a method which includes the steps of receiving a request for a grant at a base station, processing the request at the base station and determining at the base station whether to issue the grant. The processing of the request occurs in the base station at the medium access control layer. The base station may issue an individual grant or a common grant responsive to the request. Alternatively, no grant may be issued at all.

One embodiment of the invention comprises a method which includes the steps of transmitting a request for a grant from a mobile station, wherein the request specifies one of a set of available classes of service, if a grant corresponding to the request is issued, transmitting data according to the received grant, and if no grant corresponding to the request is issued, transmitting data in an autonomous mode or transmitting a subsequent request, or both.

Numerous additional embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for scheduling data transmissions in a wireless communication system using scheduling requests and grants.

In one embodiment, a wireless communication system having a base station and one or more mobile stations provides, between the base station and each mobile station, a forward link for communicating information from the base station to the mobile station, and a reverse link for communicating information from the mobile station to the base station. The mobile station may communicate different types of information to the base station. For example, the mobile station may communicate voice, data or multimedia information to the base station. The mobile station may have different Quality of Service (QoS) requirements for each of these different types of information. For example, voice information must be transmitted in real time in order to avoid audible artifacts of delayed delivery of the information. Non-voice information, on the other hand, may require a higher overall data rate, but may be able to tolerate delays that would be unacceptable for voice information. Embodiments of the present invention therefore provide means to associate different QoS levels with different types of data so that the corresponding QoS requirements can be met.

In one embodiment, each mobile station may transmit data autonomously to the serving base station at a rate no higher than a predetermined rate, such as 19.2 kbps for the initial transmission (after a hybrid automatic repeat, the actual effective rate drops to about half this rate). If a higher transmission rate is needed, the mobile station transmits a request for a grant to the base station. The request identifies the mobile station, a class of service for the data to be transmitted, the amount of data that needs to be transmitted, and a maximum supportable traffic-to-pilot (T/P) ratio. The mobile station may transmit a separate request corresponding to each of a set of service classes. The base station receives the requests for grant from the mobile station and determines an allocation of resources for this and any requests that are received from other mobile stations served by the base station. Based on the allocation determined by the base station, the base station may transmit a grant responsive to each request to the corresponding mobile stations. If the base station determines that no resources are to be allocated to a particular mobile station given the available information about class of service no grant is transmitted. The grants specify the corresponding mobile stations, and maximum T/P ratios (for the corresponding class of service in case of a common grant). The mobile stations which receive these grants can then transmit their data according to the appropriate grant parameters.

One of the benefits provided by this system is that the base station does not simply forward the mobile stations' requests to a base station controller, as in the prior art, but instead processes the requests, makes resource allocation determinations, and transmits grants to the mobile stations according to the resource allocation. The base station thereby eliminates the delays that result from the need in prior art systems to transmit the mobile station requests from the base station to the base station controller and to return scheduling information from the base station controller to the base station. In one embodiment, the system may also realize benefits from making common grants to the mobile stations, as well as individual grants. The common grants may specify particular classes of service, and any mobile station may transmit data under a common grant, as long as the data is associated with the class of service identified in the common grant. Various other benefits may be provided as described in more detail below in relation to the preferred embodiments.

A preferred embodiment of the invention is implemented in a wireless communication system that conforms generally to a release of the cdma2000 specification. cdma2000 is a 3rd Generation (3G) wireless communication standard that is based on the IS-95 standard. The cdma2000 standard has evolved and continues to evolve to continually support new services in a standard 1.25 MHz carrier. The preferred embodiment of the invention is intended to be operable in systems utilizing Release D of the cdma2000 standard, but other embodiments may be implemented in other Releases of cdma2000 or in systems that conform to other standards (e.g., W-CDMA). The embodiments described herein should therefore be considered exemplary, rather than limiting.

Figure 1:
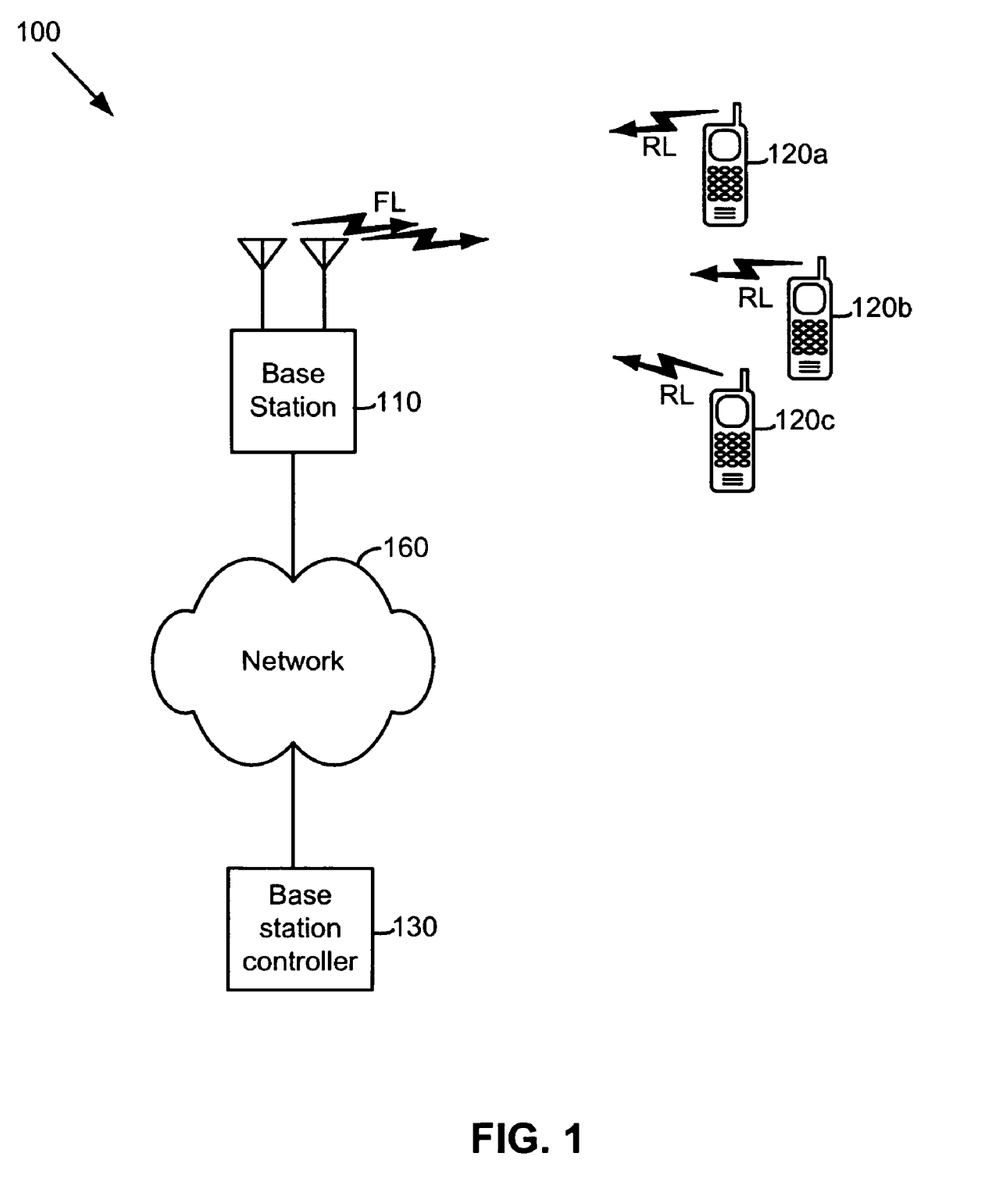
FIG. 1 is a diagram illustrating the structure of an exemplary wireless communications system in accordance with one embodiment.

Referring to FIG. 1, a diagram illustrating the structure of an exemplary wireless communications system is shown. As depicted in this figure, system 100 comprises a base station 110 that is configured to communicate with a plurality of mobile stations 120. Mobile stations 120 may, for example, be cellular telephones, personal information managers (PIMs or PDA), or the like that are configured for wireless communication. It should be noted that these devices need not actually be "mobile," but may simply communicate with base station 110 via a wireless link. Base station 110 transmits data to mobile stations 120 via corresponding forward link (FL) channels, while mobile stations 120 transmit data to base station 110 via corresponding reverse link (RL) channels.

It should be noted that, for the purposes of this disclosure, identical items in the figures may be indicated by identical reference numerals followed by a lowercase letter, e.g., 120a, 120b, and so on. The items may be collectively referred to herein simply by the reference numeral.

Base station 110 is also coupled to a base station controller 130 via a network 160. base station controller 130 is connected to a number of additional base stations (not shown) through network 160, forming a wireless communication system. Base station 110 may also be connected to various other system components, such as data servers, a public switched telephone network, the Internet, and the like through network 160. While the base station controller conventionally controls the scheduling of transmissions for the base stations in the system, at least a portion of the scheduling responsibilities in the present system are moved to base station 110.

It should be noted that the mobile stations and system components in this figure are exemplary and other systems may comprise other combinations of devices and may have different topologies than the specific configuration depicted in FIG. 1.

While, in practice, the specific designs of base station 110 and mobile stations 120 may vary significantly, each serves as a wireless transceiver for communicating over the forward and reverse links. Base station 110 and mobile stations 120 therefore have the same general structure. This structure is illustrated in FIG. 2.

Figure 2:
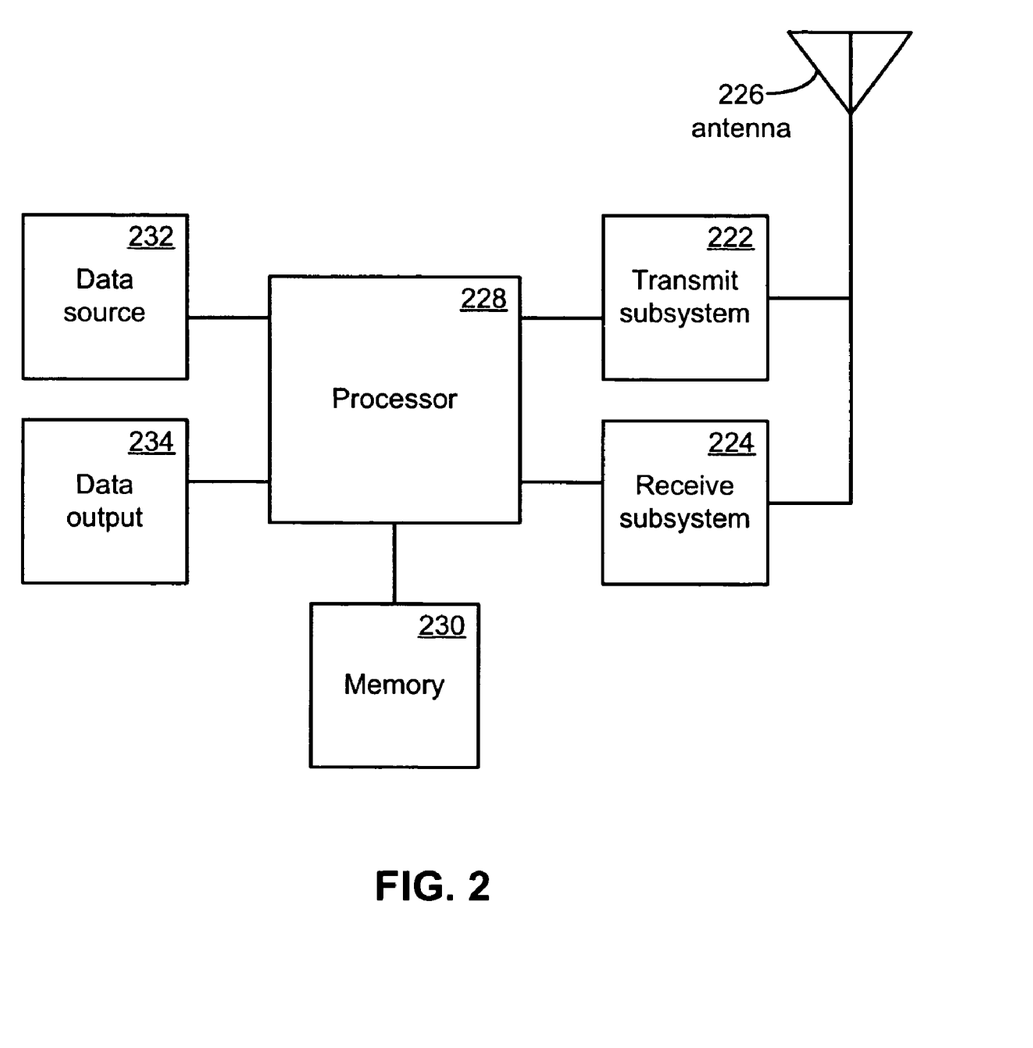
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and reverse links through antenna 226. Transmit subsystem 222 and receive subsystem 224 are also coupled to processor 228, which is configured to control transmit and receive subsystems 222 and 224. Memory 230 is coupled to processor 228 to provide working space and local storage for the processor. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 350, which may be a general-purpose microprocessor, a digital signal processor (DSP) or a special-purpose processor, may perform some or all of the functions of other components of the transceiver, or any other processing required by the transceiver. The scope of the claims appended hereto are therefore not limited to the particular configurations described herein.

Considering the structure of FIG. 2 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 222, receive subsystem 224 and antenna 226. The processing subsystem could be considered to include processor 228, memory 230, data source 232 and data output 234.

Figure 3:
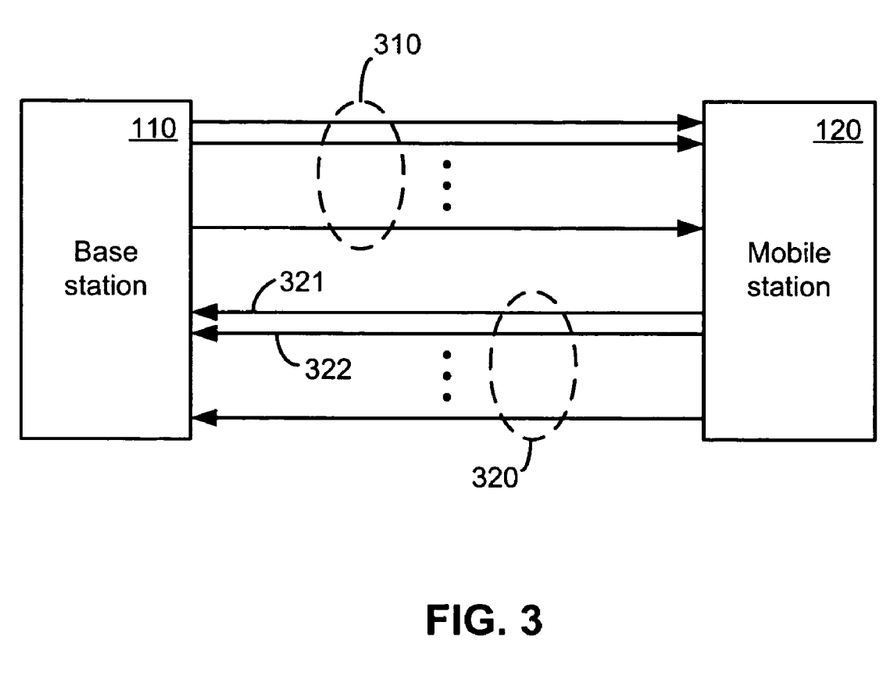
FIG. 3 is a diagram illustrating multiple channels between the mobile station and base station in accordance with one embodiment.

As indicated above, the communication link between the base station and the mobile station actually comprises various channels. Referring to FIG. 3, a diagram illustrating multiple channels between the mobile station and base station is shown. As depicted in the figure, Base station 110 transmits data to mobile station 120 via a set of forward link channels 310. These channels typically include both traffic channels, over which data is transmitted, and control channels, over which control signals are transmitted. Each of the traffic channels generally has one or more control channels associated with it. Forward link channels 310 may include, for example, a Forward Fundamental Channel (F-FCH) that may be used to transmit low-speed data, a Forward Supplemental Channel (F-SCH) that may be used for high-speed, point-to-point communications, or a Forward Packet Data Channel (F-PDCH) that may be used to broadcast messages to multiple recipients. The channels may also include a Forward Dedicated Control Channel (F-DCCH), a forward broadcast control channel (F-BCCH) or a Forward Paging Channel (F-PCH) that may be used to transmit control information relating to the traffic channels or to other aspects of the operation of the system.

Mobile station 120 transmits data to base station 110 via a set of reverse link channels 320. Again, these channels typically include both traffic channels and control channels. Mobile station 120 may transmit control information back to the base station over such channels as a reverse access channel (R-ACH), an extended reverse access channel (R-EACH), a reverse request channel (R-REQCH), a reverse dedicated control channel (R-DCCH), a reverse common control channel (R-CCCH), or a reverse rate indicator channel (R-RICH). The mobile station may transmit data via channels such as a reverse packet data channel (R-PDCH).

In many instances, reverse link capacity is interference limited. Base stations allocate available reverse link communication resources to mobile stations for efficient utilization to maximize throughput in accordance with Quality of Service (QoS) requirements for the various mobile stations.

Maximizing the use of the reverse link communication resources involves several factors. One factor to consider is the mix of scheduled reverse link transmissions from the different mobile stations, each of which may be experiencing varying channel quality at any given time. To increase overall throughput (the aggregate data transmitted by all the mobile stations in the cell), it is desirable for the entire reverse link to be fully utilized whenever there is reverse link data to be sent. To fill the available capacity, some mobile stations may be granted access at the highest rate they can support. Additional mobile stations may be granted access until capacity is reached. In deciding which mobile stations to schedule, the base station may therefore consider the maximum rate each mobile station can support and the amount of data each mobile station has to transmit. A mobile station capable of higher throughput (considering both the data rate supportable by the mobile station and the amount of data the mobile station has to transmit) may be selected instead of an alternate mobile station that cannot currently support the higher throughput.

Another factor to be considered is the quality of service required by each mobile station. It may be permissible to delay access to a particular mobile station in hopes that the mobile station's channel (or more specifically its supportable throughput) will improve, instead selecting mobile station that can support higher throughput. It may be the case, however, that a sub-optimal mobile station may need to be granted access in order to allow the mobile station to meet minimum quality of service guarantees. Therefore, the data throughput that is actually scheduled may not be the absolute maximum, but may instead be optimized in light of channel conditions, available mobile station transmit power, quality of service requirements, and similar factors.

Various scheduling mechanisms may be used to allow a mobile station to transmit data on the reverse link. One class of reverse link transmissions involves the mobile station making a request to transmit on the reverse link. The base station makes a determination of whether resources are available to accommodate the request, and a grant can be made by the base station to allow the transmission. The grant be made specifically to an individual mobile station, or it may be a common grant to all of the mobile stations. A common grant is broadcast to all of the mobile stations, although it may not be decoded by all of the mobile stations. Alternatively, the mobile station may not have sufficient data or channel quality to justify a request, and may autonomously transmit data to the base station.

The base station allocates the capacity of the reverse link to one or more mobile stations. A mobile station that is granted access is allowed a maximum power level or data rate for the transmissions that will be made under the grant. In one embodiment, the reverse link capacity is allocated using a T/P ratio. Since the pilot signal of each mobile station is adaptively controlled by a power control, specifying the T/P ratio indicates the available power for use in transmitting data on the reverse link. A corresponding data rate can be determined from the T/P ratio.

Figure 4:
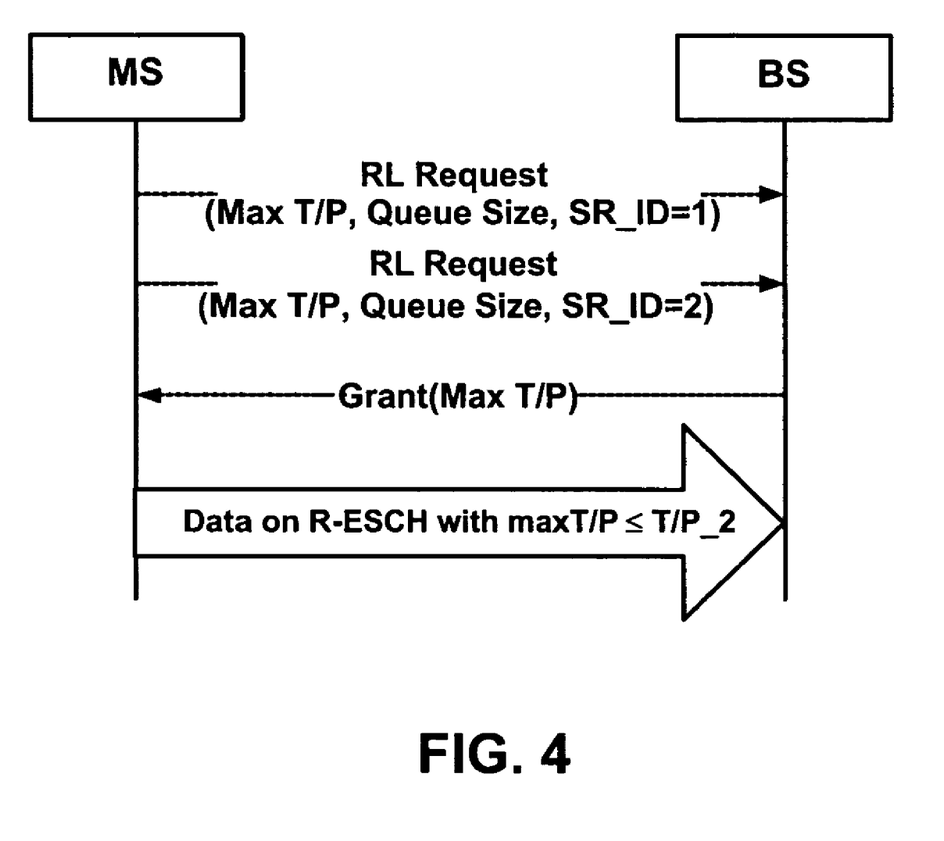
FIG. 4 is a flow diagram illustrating the communication of requests and grants between a mobile station and a base station in accordance with one embodiment.

Referring to FIG. 4, a diagram illustrating a method of transmitting requests and corresponding grants in accordance with one embodiment is shown. As depicted in FIG. 4, reverse-link requests are first transmitted from the mobile station to the base station. Each request identifies the mobile station making the request, and also identifies a maximum supportable T/P ratio, the particular class of service for which the grant is requested, and the size of the queue corresponding to the identified class of service. In this embodiment, the class of service is identified by a service reference identifier (SR_ID) in a QoS control field of the request. The service reference identifier consists of three bits and a reserve bit that identify up to six data services, plus Layer 3 signaling. The classes are assigned for the mobile station at call setup.

The mobile station may transmit multiple requests. In the particular situation depicted in FIG. 4, the mobile station transmits two requests. One of the requests identifies service class SR_ID=1, while the other identifies service class SR_ID=2. This is necessary in this embodiment because requests are made on a per-mobile station, per-class basis. In other words, each mobile station must transmit a request to the base station for each class of service that has data to be transmitted. If the mobile station has data to be transmitted where the data was associated with a third class of service, a third request must be transmitted to the base station.

FIG. 4 depicts only a single grant being transmitted from the base station to the mobile station. This may be the result of several different conditions. For example, if the base station does not receive one of the requests, it is not aware of the request and cannot issue a grant corresponding to that request. Another reason may be that the base station might have received both of the requests, but determined that reverse link resources should be allocated to only one of the requested classes of service. If the base station determines that reverse link resources should be allocated in response to a request, a grant will be transmitted to the mobile station in response to each of the requests. Then, if a request is granted, the mobile station will begin transmitting data under the grant.

As noted above, the forward and reverse links between the mobile station and the base station include a number of channels. These channels may include ones that are intended to communicate specific types of control data and traffic. The channels may therefore include request channels, grant channels, traffic channels, acknowledgment channels, and the like. The specific channels may vary from one embodiment to another.

As noted above, the grants that are issued by the base station may be either individual grants, or common grants. In one embodiment, the base station receives requests from one or more of the mobile stations which it serves and performs some manner of processing on these requests in order to determine how the reverse link resources should be allocated. (Any of a variety of algorithms may be used in this determination, but these algorithms will not be described here, as they are not essential to the invention.) Based upon this processing, the base station may issue individual grants, common grants, or both. Alternatively, the base station may not issue any grants at all.

Each of the individual grants identifies a specific mobile station and a granted T/P ratio. Each common grant identifies granted T/P ratios for specific classes of service, but does not identify a particular mobile station. Any mobile station that has data in an identified class of service may transmit data under the common grant at the corresponding T/P ratio. As noted above, the base station may also determine that no grant at all should be issued with respect to certain mobile stations and/or classes of service. Thus, using this mechanism, the base station can give priority to higher classes of service, prevent transmission of data associated with selected classes, give priority to classes of service having more data to be transmitted, and so on.

It should be noted that, in this embodiment, the processing of the MAC layer messages received from the mobile stations is performed by the base station. This scheduling mechanism sharply contrasts with the prior art, in which the scheduling messages are Layer 3 messages that are normally processed by the base station controller. Thus, in a typical, conventional system, the base station does not make any scheduling decisions, but simply forwards information from the mobile stations to the base station controller so that the base station controller can make the scheduling decisions.

The processing of the MAC layer messages at the base station requires several changes from typical prior art systems. For instance, because the base station conventionally did not perform the scheduling/allocation of reverse link resources, base stations conventionally had no logic for receiving and processing the requests from the mobile stations. It is therefore necessary to provide this logic, which typically is not found in conventional base stations. This logic may be implemented in hardware or software. Another difference between the present system and a conventional system is the fact that, because the base station processes information at the MAC layer (Layer 2) instead of Layer 3, the mobile stations must send scheduling messages (requests) as Layer 2 messages, rather than Layer 3 messages.

The processing of mobile stations' reverse link requests at the base station is somewhat unusual because it has conventionally been thought that the presence of multiple base stations and mobile stations in the system necessitated the use of the base station controller for scheduling in order to coordinate between the base stations. In the present system, however, it has been determined that this coordination is not necessary. This is because the power at which each mobile station transmits data is controlled so that errors are minimized, but not at the expense of wasting energy. In particular, the mobile station is controlled to use just enough power to achieve a minimum acceptable error rate. Typically, therefore, only one base station (the serving base station) will receive and correctly decode data from the mobile station. As a result, it is unnecessary to coordinate with other base stations, which most likely will not receive valid data from the mobile station.

In one embodiment, the request-grant process is event-driven. As the mobile station receives or generates data for a particular class of service, the data is stored in a buffer corresponding to that class of service. When the mobile station accumulates enough data in one of the buffers, the request is triggered. The frequency of requests is controlled in this embodiment by a signaling variable that specifies the minimum interval between two requests. The request identifies the class of service and the amount of data in the buffer (as well as the mobile station and the maximum supportable T/P ratio). The request is received by the base station, which decides whether or not to issue a grant responsive to the request. If a grant is issued, the mobile station begins transmitting data under the grant. If no grant is issued, the mobile station may transmit autonomously (typically at a much lower rate than under a grant), or it may transmit another request to the base station.

In one embodiment, once a mobile station begins transmitting under a grant, it may continue transmitting as long as the base station does not stop the transmissions. More specifically, when a mobile station receives an individual grant, the grant is to transmit a single frame of data. When the frame is received by the base station, the base station transmits an acknowledgment (ACK) to the mobile station. The acknowledgment is either a positive acknowledgment or a negative acknowledgment. If the acknowledgment is positive, the mobile station transmits another frame of data to the base station. If the acknowledgment is negative, the mobile station does not transmit another frame of data, but may transmit another request if there is sufficient data in the corresponding buffer to justify the request.

If the mobile station is transmitting under a common grant instead of an individual grant, the mobile station may transmit data for a predetermined interval. This interval is specified by the common grant. If the mobile station still has sufficient data in the appropriate buffer, a new request is triggered and transmitted to the base station. Alternative embodiments may use an ACK-and-continue scheme, in which the transmission may continue as long as positive acknowledgements are received, as described above.

As indicated above, in an ACK-and-continue scheme, the mobile station may continue to transmit data under an individual grant as long as the mobile station continues to receive positive acknowledgments from the base station. In one embodiment, the mobile station is configured to provide feedback to the base station in regard to the transmission of the data frames subsequent to the first frame. This feedback may, for example, comprise updates to the maximum T/P ratio supportable by the mobile station. In one embodiment, the mechanism for providing this feedback could be similar to the mechanism used for power control, in that a very small number of bits could be periodically transmitted to the base station to indicate that the maximum supportable T/P ratio has increased or decreased. This feedback could be taken into account by the base station in determining whether to allow transmissions by the mobile station to continue or to terminate these transmissions. The base station could then send positive or negative acknowledgments, as appropriate.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

One or more of the steps of the methods and/or algorithms described in connection with the embodiments disclosed herein may be interchanged without departing from the scope of the invention. The steps of the disclosed methods and/or algorithms may be embodied in hardware, in software modules executed by a processor, or in a combination of the two. Software modules may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a computer system. In the alternative, the processor and the storage medium may reside as discrete components in a computer system.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station comprising:
a transceiver subsystem; and
a processing subsystem configured
to receive a request for grant including an identification of a specific service class from a mobile station, the specific service class being one of a set of available service classes, each service class corresponding to a particular type of data to be transmitted by the mobile station, and wherein the request for grant is received if a threshold amount of data is detected in buffers at the mobile station,
to make a determination whether or not to issue a grant to the mobile station in response to the request for grant, to send a grant for the specific service class to the mobile station if a determination is made at the base station to issue the grant, and
to receive data for the specific service class transmitted according to the grant on a reverse link from the mobile station to the base station, wherein the base station is a serving base station.

2. The base station of claim 1, wherein the processing subsystem is configured to make the determination independently of a base station controller.

3. The base station of claim 1, wherein the processing subsystem is configured to make the determination independently of one or more additional base stations.

4. The base station of claim 1, wherein the determination is made at a medium access control layer.

5. The base station of claim 1, wherein if the processing subsystem determines that the grant should be issued to the mobile station, the base station is configured to issue the grant.

6. The base station of claim 5, wherein the processing subsystem is configured to issue at least one individual grant and at least one common grant.

7. The base station of claim 1, wherein the processing subsystem is configured to identify the mobile station in the grant.

8. The base station of claim 1, wherein the processing subsystem is configured to issue the grant as an individual grant.

9. The base station of claim 8, wherein the processing subsystem is configured to identify the mobile station in the individual grant.

10. The base station of claim 1, wherein the processing subsystem is configured to issue the grant as a common grant.

11. The base station of claim 10, wherein-the processing subsystem is configured to identify in the common grant the specific service class for which the common grant is issued.

12. A mobile station comprising:
a transceiver subsystem; and
a processing subsystem coupled to the transceiver subsystem and configured
to process information received from the transceiver subsystem,
to generate information to be transmitted by the transceiver subsystem,
to generate a request for transmission to a base station in a layer for determining at the base station whether or not to issue a grant to the mobile station in response to the request for grant, the request for transmission identifying a specific class of service among a set of available classes of service, each service class corresponding to a particular type of data to be transmitted by the mobile station,
to receive a corresponding grant determined at the base station,
to control the transceiver subsystem to transmit data for the specific class of service according to the received grant on a reverse link from the mobile station to the base station, wherein the base station is a serving base station; and
to monitor buffers, wherein for each buffer, to generate the request for transmission if a threshold amount of data is detected in the each buffer.

13. The mobile station of claim 12, wherein the each buffer is associated with one of the classes of service.

14. The mobile station of claim 13, wherein the request for transmission for the each buffer specifies the class of service associated with the each buffer and the amount of data in the each buffer.

15. The mobile station of claim 12, wherein the processing subsystem is configured to identify a maximum supportable traffic-to-pilot ratio in the request.

16. The mobile station of claim 15, wherein the processing subsystem is configured to generate feedback while transmitting under the grant, wherein the feedback indicates changes in the maximum supportable traffic-to-pilot ratio.

17. The mobile station of claim 12, wherein the processing subsystem is configured to generate one or more additional requests for transmission to the base station if no grant is received in response to a previous request for transmission.

18. , The mobile station of claim 12, wherein if no grant is received from the base station in response to the request for transmission, the processing subsystem is configured to autonomously transmit data to the base station.

19. A method for a base station comprising:
receiving a request for grant including an identification of a specific service class from a mobile station at the base station, the specific service class being one of a set of available service classes, each service class corresponding to a particular type of data to be transmitted by the mobile station, and wherein the request for grant is received if a threshold amount of data is detected in buffers at the mobile station;

processing the request at the base station;

determining at the base station whether to issue a grant to the mobile station in response to the request for grant;

sending a grant for the specific service class to the mobile station if a determination is made at the base station to issue the grant to the mobile station; and receiving data for the specific service class transmitted according to the grant on a reverse link from the mobile station to the base station, wherein the base station is a serving base station.

20. The method of claim 19, further comprising issuing the grant if the base station determines that the grant should be issued.

21. The method of claim 20, further comprising issuing at least one individual grant and at least one common grant.

22. The method of claim 19, further comprising issuing the grant as an individual grant.

23. The method of claim 22, further comprising identifying the mobile station in the grant.

24. The method of claim 23, further comprising identifying the specific service class in the grant.

25. The method of claim 19, further comprising issuing the grant as a common grant.

26. The method of claim 25, further comprising identifying the specific service class in the grant.

27. The method of claim 20, wherein the determining whether to issue the grant is performed without communicating with a base station controller.

28. The method of claim 19, wherein the determining whether to issue the grant is performed without communicating with one or more additional base stations.

29. The method of claim 19, wherein the determining whether to issue the grant is performed at a medium access control layer.

30. The method of claim 19, further comprising:
transmitting the request for grant from the mobile station to the base station;
if a grant corresponding to the request is issued, transmitting data in the specific service class according to the received grant; and
if no grant corresponding to the request is issued, either transmitting data in the specific service class in an autonomous mode, or transmitting a subsequent request, or both.

31. The method of claim 30, wherein each buffer is associated with one of the service classes.

32. The method of claim 31, further comprising specifying in the request for the each buffer the class of service associated with the each buffer and the amount of data in the each buffer.

33. The method of claim 30, further comprising specifying in the request for grant a maximum supportable traffic-to-pilot ratio.

34. The method of claim 33, further comprising generating feedback while transmitting under the grant, wherein the feedback indicates changes in the maximum supportable traffic-to-pilot ratio.

35. A method for a mobile station comprising:
transmitting a request for grant from the mobile station to a base station in a layer for determining at the base station whether or not to issue a grant to the mobile station in response to the request for grant, wherein the request identifies a specific class of service among a set of available classes of service, each service class corresponding to a particular type of data to be transmitted by the mobile station;
if a grant corresponding to the request is determined at and issued by the base station, transmitting data for the specific class of service on a reverse link from the mobile station to the base station according to the received grant, wherein the base station is a serving base station; and
monitoring buffers, wherein for each buffer, generating the request for grant if a threshold amount of data is detected in the each buffer.

36. The method of claim 35, wherein the each buffer is associated with one of the classes of service.

37. The method of claim 36, further comprising specifying in the request for the each buffer the class of service associated with the each buffer and the amount of data in the each buffer.

38. The method of claim 35, further comprising specifying in the request a maximum supportable traffic-to-pilot ratio.

39. The method of claim 38, further comprising generating feedback while transmitting under the grant, wherein the feedback indicates changes in the maximum supportable traffic-to-pilot ratio.

40. An apparatus comprising:
means for transmitting a request for grant from the mobile station to a base station in a layer for determining at the base station whether or not to issue a grant to the mobile station in response to the request for grant, wherein the request identifies a specific class of service among a set of available classes of service, each service class corresponding to a particular type of data to be transmitted by the mobile station;
means for transmitting data for the specific class of service on a reverse link from the mobile station to the base station according to a grant corresponding to the request, if the grant is determined at and issued by the base station, wherein the base station is a serving base station; and
means for monitoring buffers, wherein for each buffer, generating the request for grant if a threshold amount of data is detected in the each buffer.

41. The apparatus of claim 40, wherein each buffer is associated with one of the classes of service.

42. The apparatus of claim 41, further comprising:
means for specifying in the request for the each buffer the class of service associated with the each buffer and the amount of data in the each buffer.

43. The apparatus of claim 40, further comprising:
means for specifying in the request a maximum supportable traffic-to-pilot ratio.

44. A non-transitory computer-readable medium encoded with a computer program for a communication system, comprising:
instructions for sending a request for grant from the mobile station to a base station in a layer for determining at the base station whether or not to issue a grant to the mobile station in response to the request for grant, wherein the request identifies a specific class of service among a set of available classes of service, each service class corresponding to a particular type of data to be transmitted by the mobile station;

instructions for sending data for the specific class of service on a reverse link from the mobile station to the base station according to a grant corresponding to the request, if the grant is determined at and issued by the base station, wherein the base station is a serving base station; and instructions for monitoring buffers, wherein for each buffer, generating the request for grant if a threshold amount of data is detected in the each buffer.

* * * * *